US008789523B1

(12) United States Patent
Kribus et al.

(10) Patent No.: US 8,789,523 B1
(45) Date of Patent: Jul. 29, 2014

(54) SOLAR-THERMAL PANEL AND RECEIVER

(75) Inventors: Abraham Kribus, Tel Aviv (IL); Gregg Luconi, Monrovia, CA (US); Dan Reznik, New York, NY (US); William Gross, Pasadena, CA (US)

(73) Assignee: Esolar, Inc., Burbank, CA (US)

( * ) Notice: Subject to any disclaimer, the term of this patent is extended or adjusted under 35 U.S.C. 154(b) by 937 days.

(21) Appl. No.: 12/896,670

(22) Filed: Oct. 1, 2010

Related U.S. Application Data

(60) Provisional application No. 61/247,834, filed on Oct. 1, 2009.

(51) Int. Cl.
*F24J 2/04* (2006.01)
(52) U.S. Cl.
USPC ........... 126/634; 126/651; 126/652; 126/658; 126/661; 126/678
(58) Field of Classification Search
USPC .................. 126/634, 651, 652, 658, 661, 678
See application file for complete search history.

(56) References Cited

U.S. PATENT DOCUMENTS

| 4,085,729 | A | * | 4/1978 | Schmidt | 126/632 |
|---|---|---|---|---|---|
| 4,148,300 | A | * | 4/1979 | Kaufman, Sr. | 126/684 |
| 4,267,826 | A | * | 5/1981 | Hitt, Jr. | 126/647 |
| D283,836 | S | * | 5/1986 | Surber et al. | D13/102 |
| 5,323,764 | A | * | 6/1994 | Karni et al. | 126/680 |
| 5,851,309 | A | * | 12/1998 | Kousa | 136/248 |
| 2009/0095282 | A1 | * | 4/2009 | Cramer | 126/634 |
| 2009/0194095 | A1 | * | 8/2009 | Fairstein | 126/652 |

* cited by examiner

*Primary Examiner* — Kenneth Rinehart
*Assistant Examiner* — Gajanan M Prabhu
(74) *Attorney, Agent, or Firm* — Brooks Acordia IP Law, P.C.; Pejman Yedidsion; Christopher Weiss

(57) ABSTRACT

Embodiments provide a solar-thermal receiver comprising: (a) a light-absorbing panel comprising: (i) a light-absorbing outer surface; and (ii) an inner volume configured to admit the flow of heat transfer fluid; (b) an inlet configured to receive heat transfer fluid; and (c) an outlet configured to output the heat transfer fluid from the volume under hydrostatic pressure. Embodiments may include vanes and/or other flow-directing and/or flow-impeding structural elements.

28 Claims, 18 Drawing Sheets

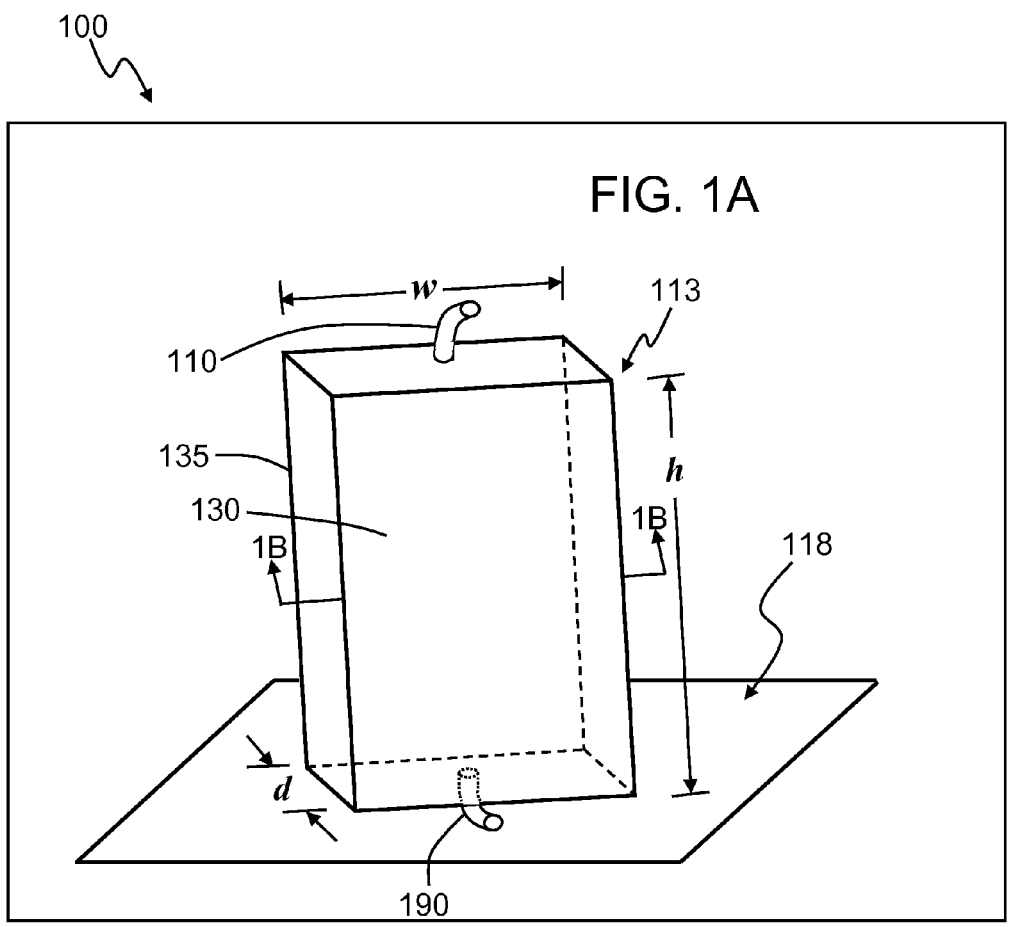
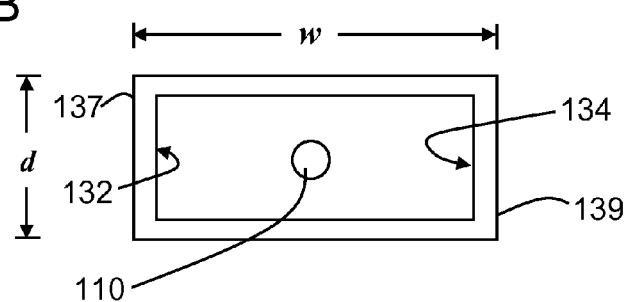

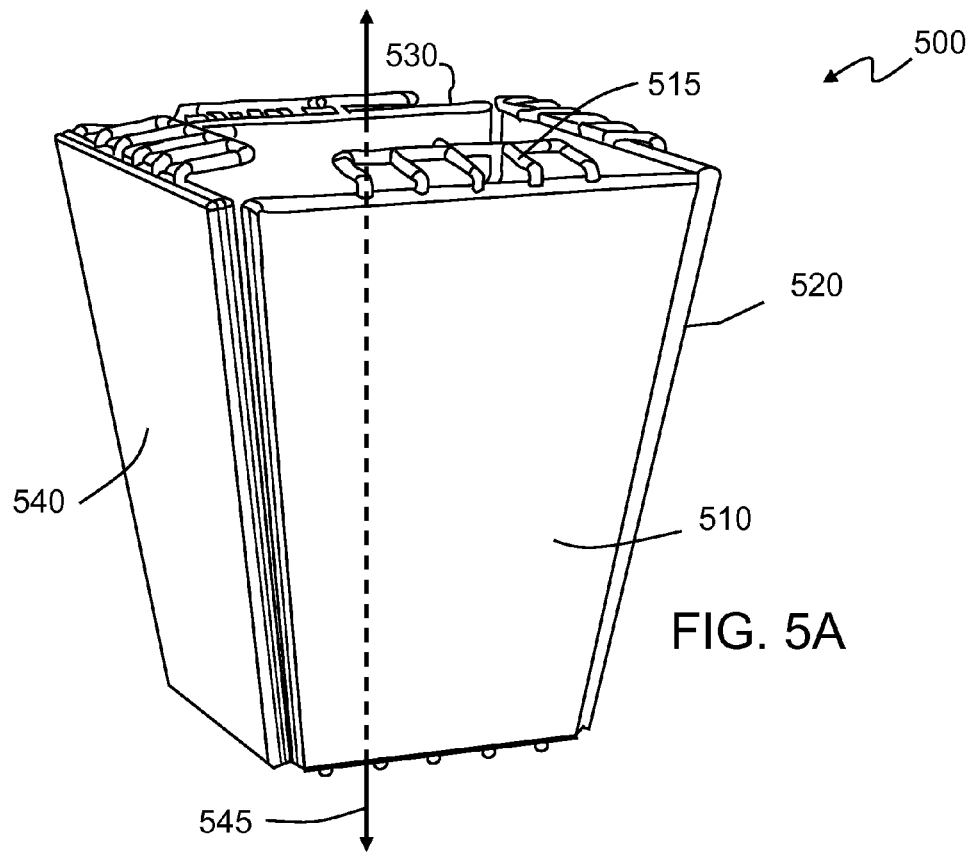
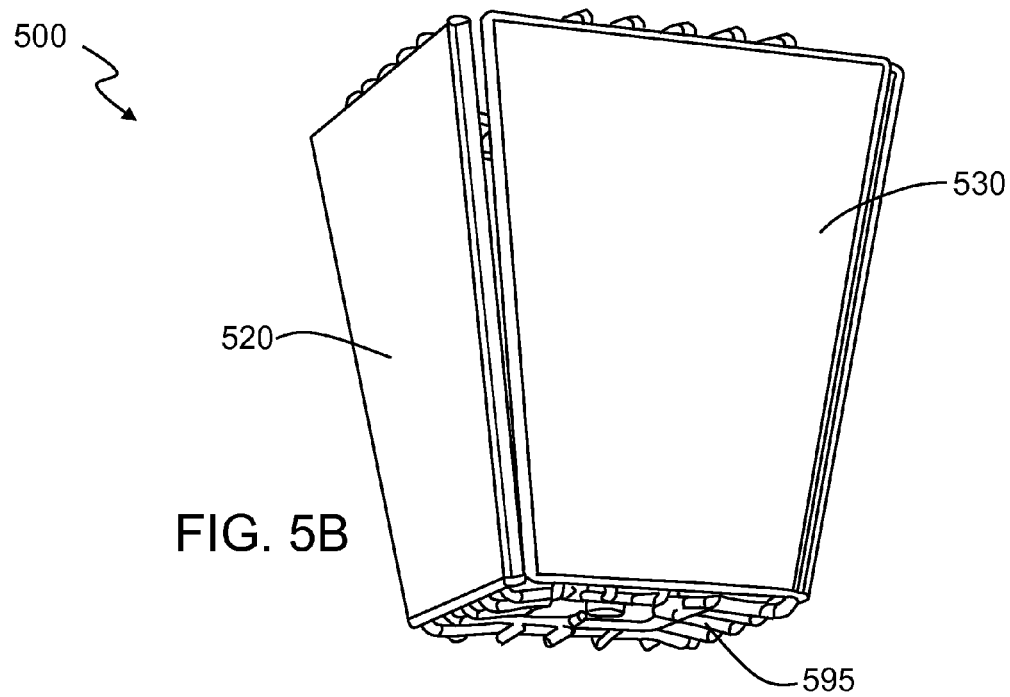

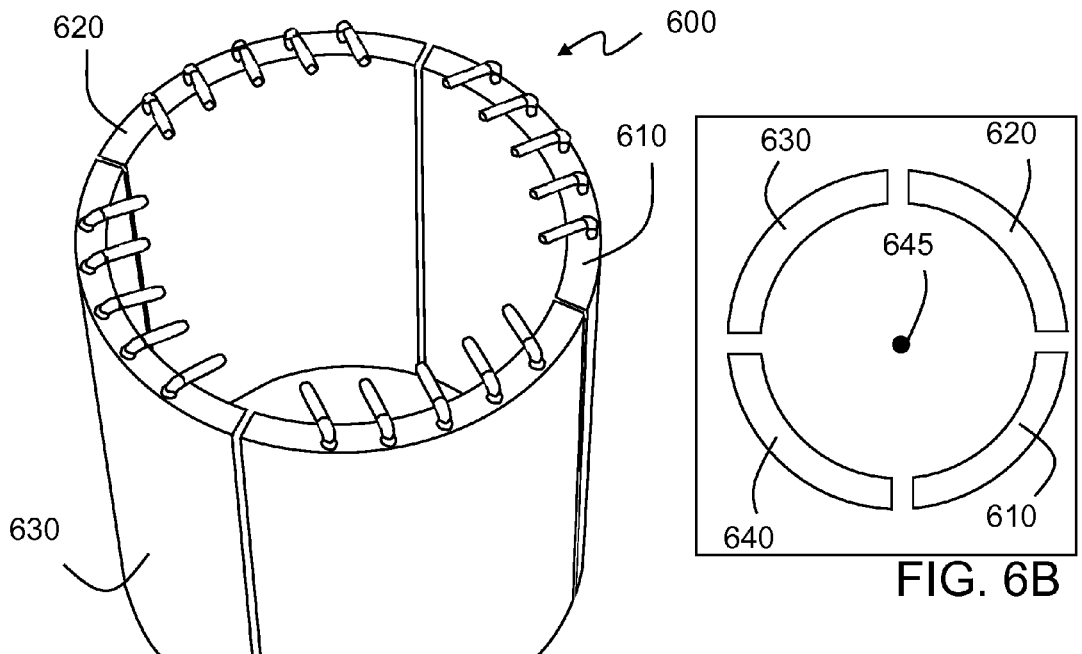
FIG. 6A
FIG. 6B
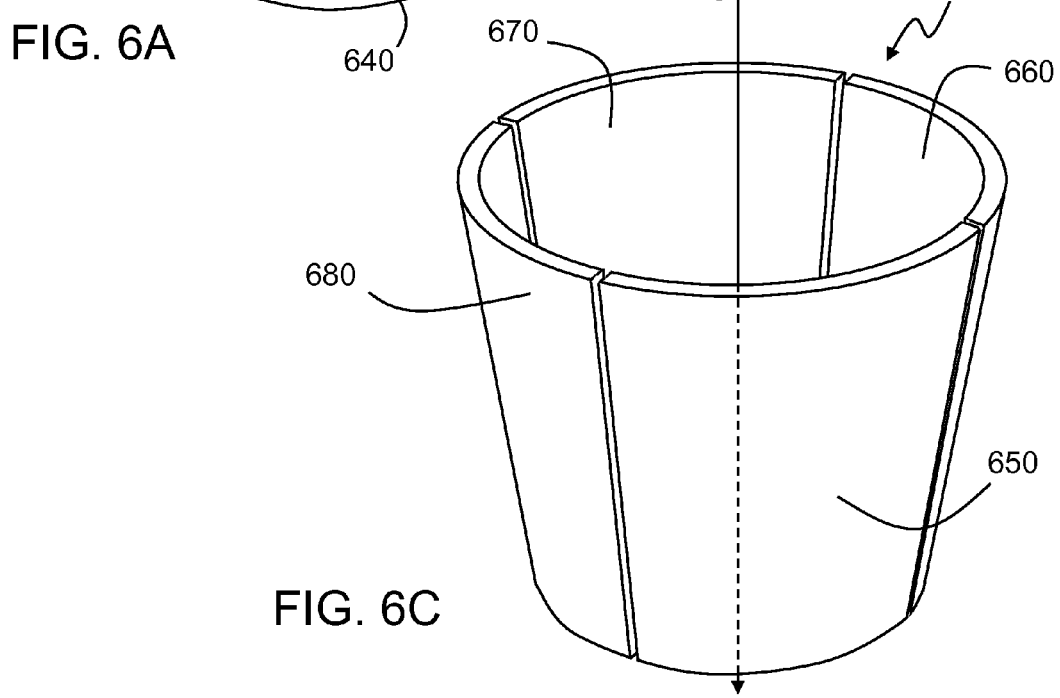
FIG. 6C

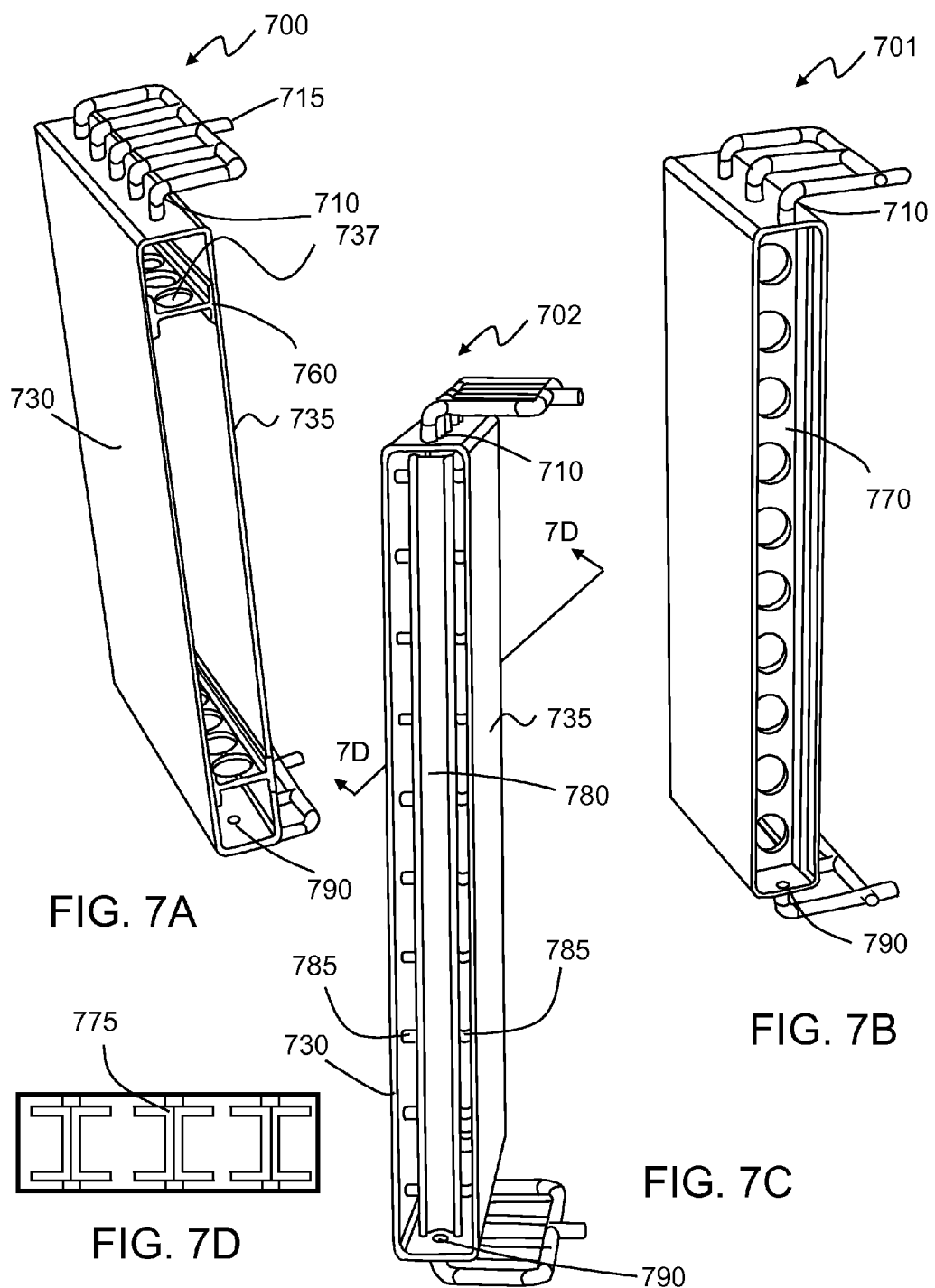

SOLAR-THERMAL PANEL AND RECEIVER

CROSS-REFERENCE TO RELATED APPLICATIONS

This application claims the benefit of U.S. Provisional Patent Application Ser. No. 61/247,834, filed Oct. 1, 2009 and is hereby incorporated by reference in its entirety for all purposes.

TECHNICAL FIELD

Embodiments pertain to solar-thermal panels and receivers.

BACKGROUND

The typical building block for a solar-thermal receiver is a panel comprising several parallel tubes, which admit several parallel flows of heat transfer fluid (HTF). The manufacturing of said panels may involve joining, welding, and reinforcement of tubes, headers, and valves, which may increase both manufacturing and maintenance costs.

SUMMARY

Embodiments comprise a solar receiver having one or more panels, where each panel is configured as a volume-enclosing container, delimited by outer surfaces. In a solar-thermal receiver that comprises one or more panels, each panel may comprise: a hollow containing member that may comprise: (i) a light-absorbing outer surface having a minimal height and a minimal width; (ii) an outer surface opposing the light-absorbing outer surface, the light-absorbing surface and the outer surface defining a minimal depth of the containing member; (iii) where the smaller of the minimal height and the minimal width is at least four times the minimal depth; and (iv) one or more inner surfaces where the one or more inner surfaces define a volume of the hollow containing member. The panel may further comprise: an inlet configured to receive a fluid into the volume; and an outlet configured to output the fluid from the volume under hydrostatic pressure. In some embodiments the solar-thermal receiver may contain a fluid which is a heat transfer fluid that may be oil, air, water, molten salt, or any combination thereof. Optionally, the hollow containing member may be prismatic or further, may be hexahedral, where the light-absorbing outer surface may be quadrilateral, trapezoidal, or rectangular in planform.

In one embodiment, the solar-thermal receiver may include vanes and/or other flow-directing and/or flow-impeding structural elements, each optionally detachably attached or fixedly attached. In some embodiments, the vanes may be configured to protrude from the inner surface into the volume of the panels, and may function to cascade the fluid. In some embodiments, the flow-impeding structural elements may have one or more apertures configured to pass the fluid.

In some embodiments, the solar-thermal receivers that contain two or more panels may be arranged in groups, forming, for example, a frusto-conical solar-thermal receiver or a frusto-pyramidal configuration. Additionally, the panels in the solar-thermal receiver, or panels thereof, may be inclined from a local-level.

BRIEF DESCRIPTION OF THE DRAWINGS

Embodiments are depicted by way of example and not limitation in the figures of the accompanying drawings, and in which:

FIG. 1A depicts an exemplary receiver panel;
FIG. 1B depicts a cross-section of the exemplary receiver panel of FIG. 1A;
FIG. 5A depicts an exemplary upper angle view of a receiver having four trapezoidal receiver panels;
FIG. 5B depicts an exemplary lower angle view of a receiver having four trapezoidal receiver panels;
FIG. 6A depicts an exemplary embodiment of a receiver having four cylindrical-sector receiver panels, and four conical-sector receiver panels;
FIG. 6B depicts a cut-out view of the receiver embodiment of FIG. 6A;
FIG. 6C depicts an exemplary embodiment of a receiver having four conical-sector receiver panels;
FIG. 7A depicts an exemplary embodiment of internal baffle members embedded within the receiver;
FIG. 7B depicts another exemplary embodiment of baffle members embedded within the receiver;
FIG. 7C depicts another exemplary embodiment of baffle members embedded within the receiver;
FIG. 7D depicts a cut-out view of the receiver showing the baffle members as exemplary I-beams.

DETAILED DESCRIPTION

Figure 1C:
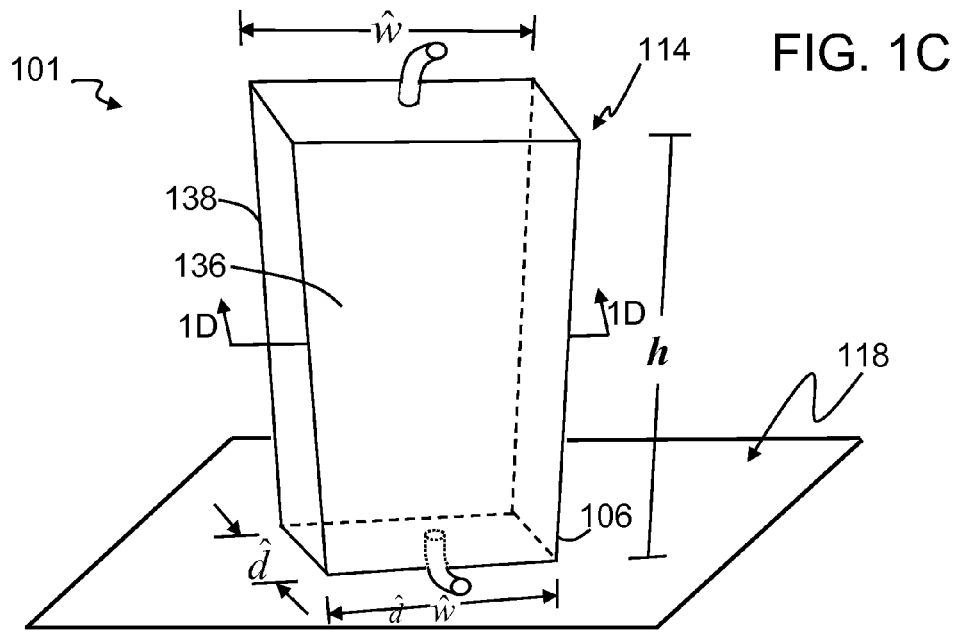
FIG. 1C depicts an exemplary trapezoidal receiver panel.

FIG. 1A depicts an embodiment of a solar-thermal receiver panel 100. In an embodiment of the solar-thermal receiver panel, a hollow containing member, such as a prismatic containing member 113 that may be hexahedral, comprises walls 130,135 where the walls 130,135 comprise an inner surface, which may contain a flowing heat transfer fluid (HTF), and an outer surface for absorbing light. The containing member may have uneven height and may be characterized by a minimal height, $h_{min}$, that is, the smallest, for example, of a measure of height, h, of the containing member. Additionally the containing member may have an uneven width, w, and/or depth, d, where the width, w, and/or depth, d, may be characterized by a minimal width, $w_{min}$, and/or depth, $d_{min}$, which may be the smallest, for example, of a measure of width, w, and/or depth, d. The prismatic containing member 113 may have a light-absorbing outer surface which may then have a height, h, a width, w, and a depth, d. In some embodiments, the surface may be a quadrilateral, a trapezoid, or a rectangle. In some embodiments, the minimum of at least the height, h, and the width, w, may be at least four times the depth, d. For example: $min(h,w) \geq 4d$. The receiver panel 100 may have an inlet 110 at one end of the containing member where an HTF, e.g., a molten salt or air, may be continuously injected from the inlet 110. An outlet 190 may also be disposed at a point distal from the inlet 110 to output the heat transfer fluid. The embodiment of FIG. 1A also depicts a local-level 118 which is a local plane tangent to the local gravity vector. FIG. 1B depicts a cross-section of the receiver panel of FIG. 1A having an inner surface 132,134, an outer surface 137,139, and an inlet 110.

Figure 1D:
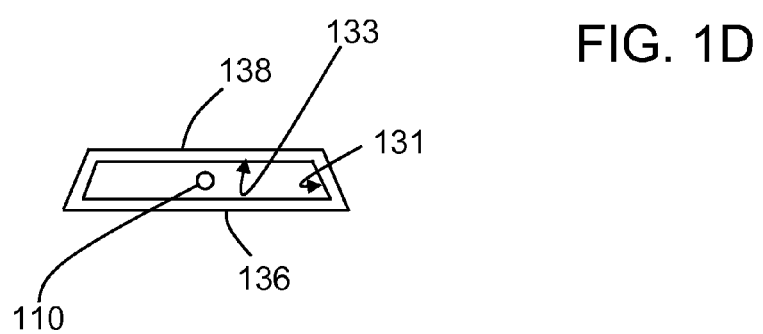
FIG. 1D depicts a cross-section of the exemplary trapezoidal receiver panel of FIG. 1C.
Figure 1E:
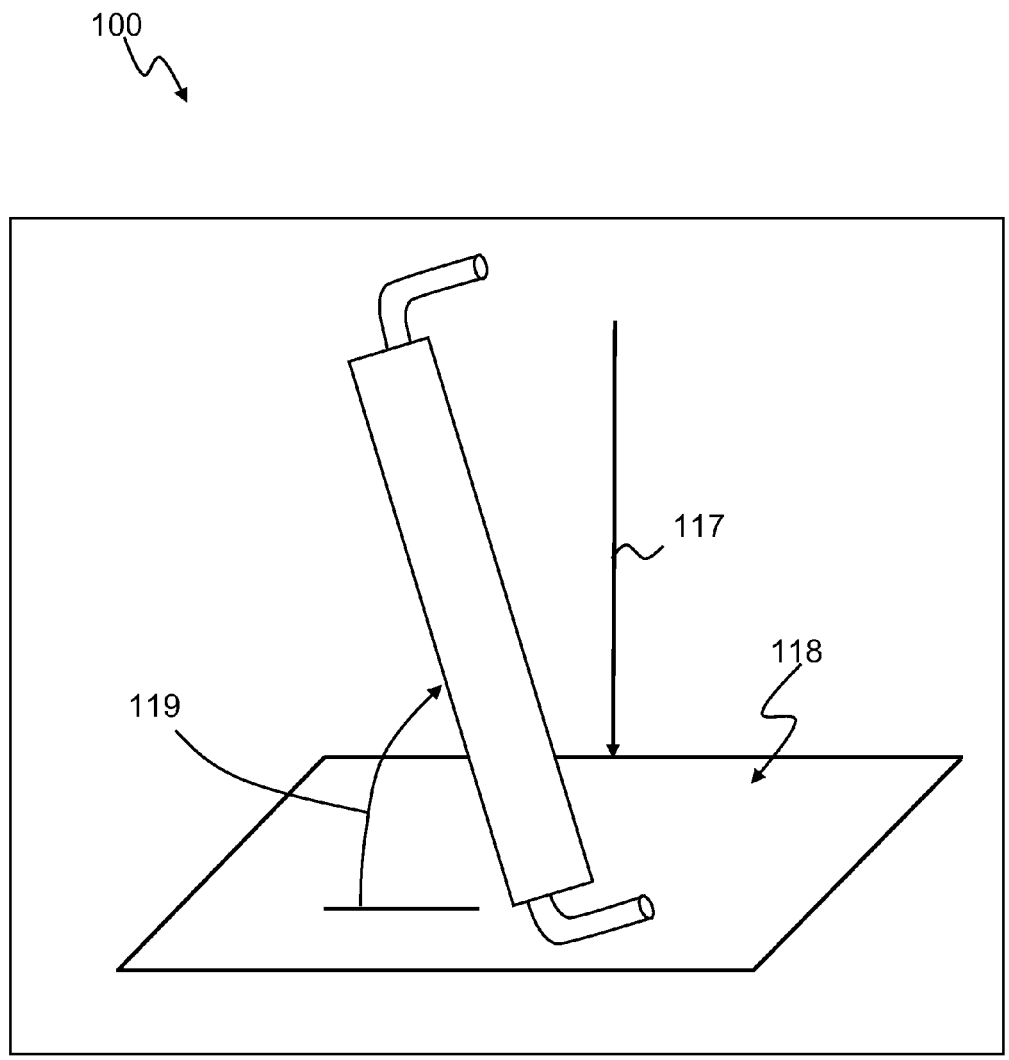
FIG. 1E depicts an exemplary receiver panel inclined from a local-level.

FIG. 1C depicts an embodiment of a solar-thermal receiver panel 101. In an embodiment of the solar-thermal receiver panel, a hollow containing member, such as a prismatic containing member 114, comprises walls 136,138 where the walls 136,138 form a quadrilateral panel and comprise an inner surface, which may conduct a heat transfer fluid (HTF), and an outer surface for absorbing light. The prismatic containing member 114 may have a light-absorbing outer surface in the shape of a quadrilateral which may then have a height, h, and an average width, $\hat{w}$, and an average depth, $\hat{d}$, where the width and depth may be averages if the receiver panels are optionally tapered. In some embodiments, the minimum of at least the height, h, and the average width, $\hat{w}$, may be at least four times the average depth, $\hat{d}$. For example: $min(h, \hat{w}) \geq 4\hat{d}$. The embodiment of FIG. 1C also depicts a local-level 118 which is a local plane tangent to the local gravity vector. The light-absorbing surface of the panel may be quadrilateral, e.g., trapezoidal, rectangular, or other geometries characterized by a minimal height and minimal width. FIG. 1D depicts a cross-section of the prismatic receiver panel of FIG. 1C having an inner surface 131,133, an outer surface 136,138, an inlet 110. FIG. 1E depicts the receiver panel 100 inclined at an angle 119 elevated from the local-level 118, an the local gravity vector 117.

Figure 1F:
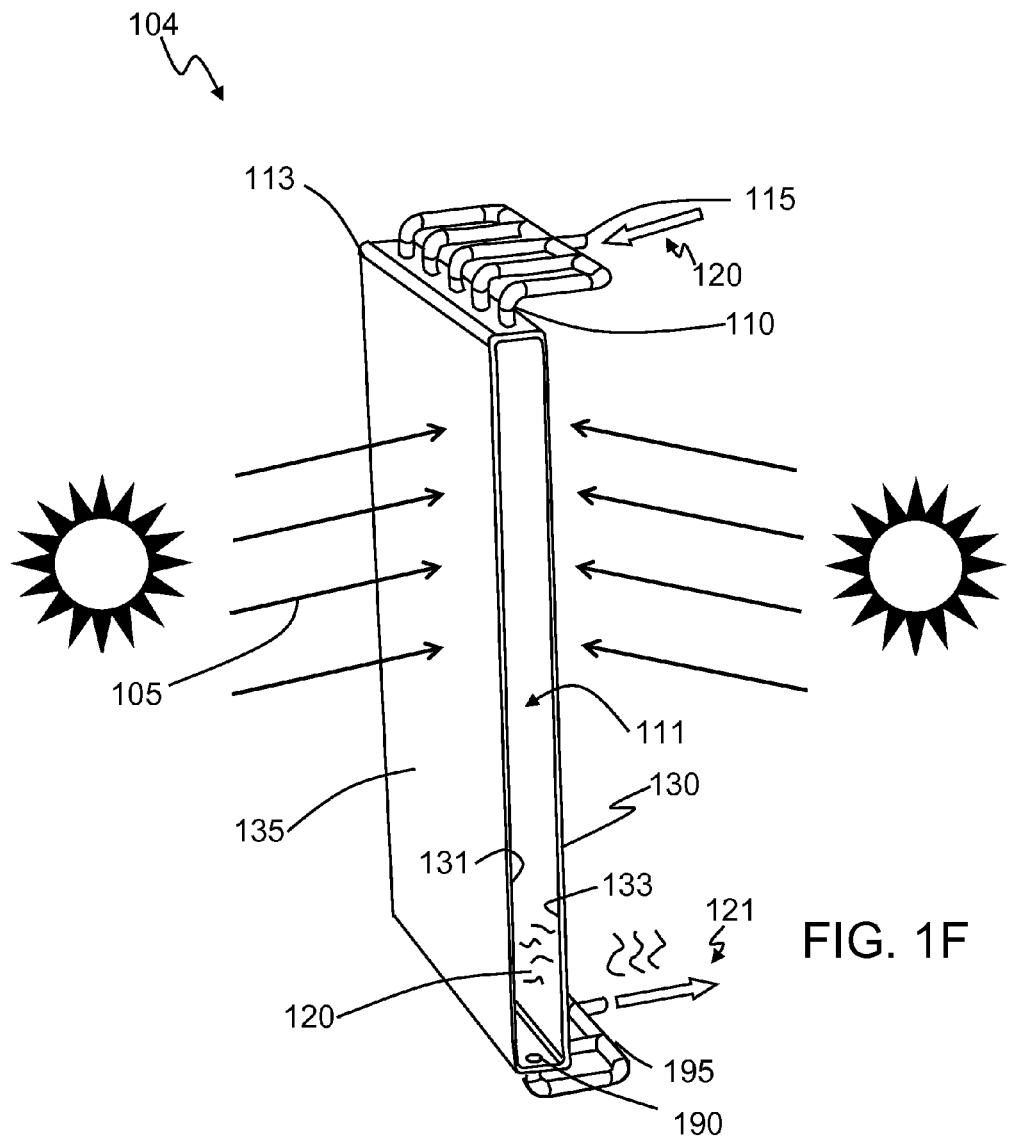
FIG. 1F depicts an exemplary receiver panel having dual-walled illumination and flood flow.

FIG. 1F depicts a light-absorbing receiver panel 104 having a volume 111 defined by the inner surfaces 131,133. Concentrated light 105, for example, as produced by a heliostat field, is depicted as illuminating the outer surfaces of both walls 130,135 of the receiver panel 104. The walls 130, 135 of the containing member 113 may be substantially parallel to each other in some embodiments of the receiver panel 104. Unheated HTF 120, e.g., a molten salt, oil, or air, may be emerging from, for example, a cold storage tank and/or an outlet of a heat exchanger, and may be injected into the interior volume 111 of the containing member 113 via a header or manifold 115 comprising two or more inlets. The flow rate may be adjusted such that the interior volume 111 of the containing member 113 may be filled, i.e., flooded, with the HTF 120. Heated HTF may be collected at the outlet 190 via a header or manifold 195 that may comprise two or more outlet 190 apertures. The heated HTF 121 may then be used to produce steam for the purposes of electricity generation. The fluid flows through the volume 111 of the containing member 113 due to, for example, a hydrostatic pressure. In one embodiment, the HTF may be a molten salt and the cold temperatures may be below 300° C. and hot temperatures may be above 500° C. Depending on the salt chemistry and application, inlet 110, and outlet 190 temperatures may be adjusted. In one embodiment, the average flux may exceed 1 $MW_{th}/m^2$.

In another embodiment, HTF may flow from the bottom of the receiver panels to the top via induced pressure provided, for example, via a pump. In this embodiment, HTF drainage may be achieved through a pump, e.g., two-way pump, or via a central bypass valve near the pump.

Figure 2:
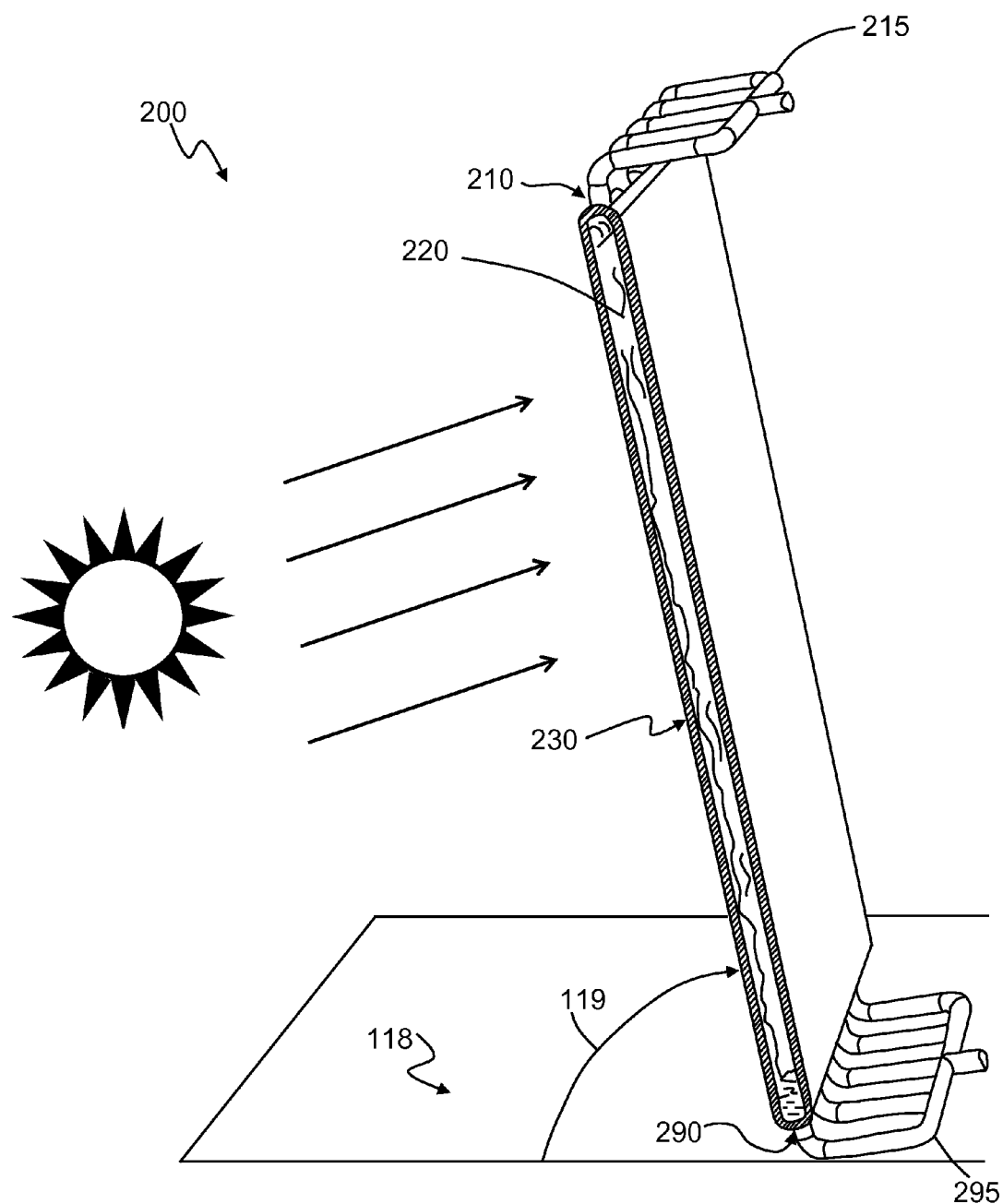
FIG. 2 depicts an exemplary receiver panel having a single-wall illumination and film flow.

FIG. 2 depicts another embodiment of a light-absorbing receiver panel 200, depicted as being illuminated on the outer surface of one wall 230, and where the receiver panel 200 may be inclined from a local-level. A film of HTF 220 may flow along the inner surface of the wall 230 depicted as having an illuminated outer surface. Unheated HTF 220 may be injected from the top inlet 210 via a header or manifold 215, comprising two or more inlets and collected at the outlet 290 via a header or manifold 295 that may comprise two or more outlet apertures. The flow in this embodiment may be gravity-driven.

Figure 3:
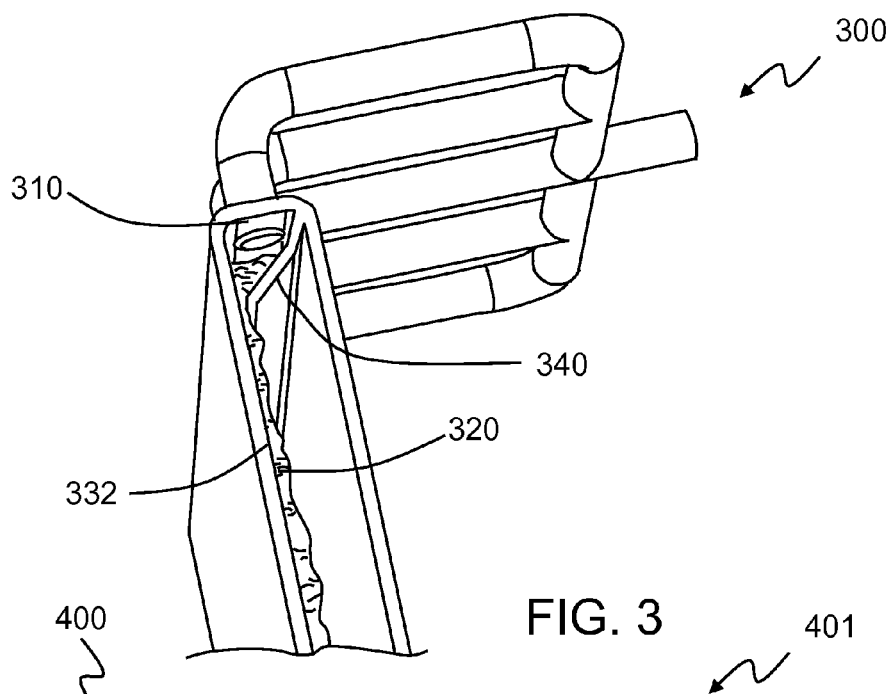
FIG. 3 depicts an exemplary film flow achieved by a guiding baffle.

FIG. 3 depicts a portion of an embodiment of the light-absorbing receiver panel 300 that may include a flow-guiding baffle 340 so that it may guide the flow of the HTF 320 along the inner surface 332 of the receiver panel 300. The flow-guiding baffle 340 may be disposed proximate to the inlet 310, and may guide the HTF 320 entering the containing member via the inlet 310. The HTF may viscously adhere to the inner surface 332 thereby effectuating a smooth or laminar flow.

Figure 4A:
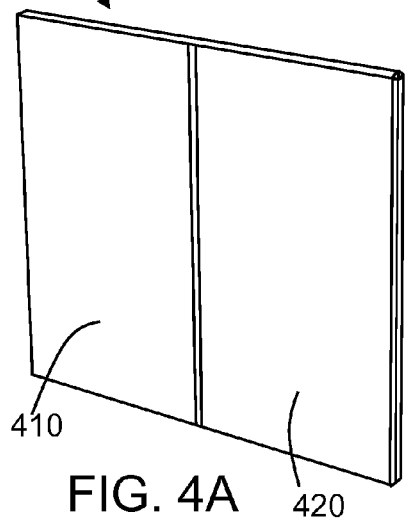
FIG. 4A depicts an exemplary receiver having two side-by-side receiver panels.
Figure 4B:
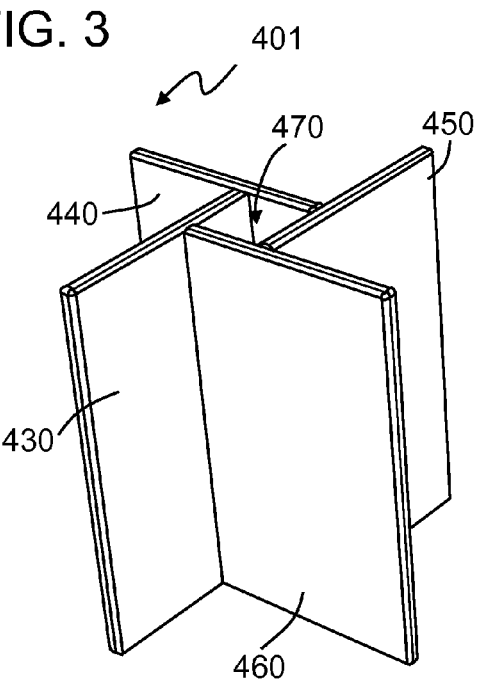
FIG. 4B depicts an exemplary receiver of four receiver panels in a star pattern.

FIGS. 4A and 4B depict a plurality of light-absorbing receiver panels that may be grouped together to form a receiver configured to accept light from a wider azimuthal range. In one embodiment, the exemplary receiver may be mounted atop a tower, and receive concentrated light from a surrounding heliostat field. FIG. 4A depicts a receiver 400 containing two receiver panels 410,420 abutting each other having outer surfaces that may be illuminated. FIG. 4B depicts a receiver 401 containing four receiver panels 430, 440,450,460 abutting each other at right angles, and thereby forming a juxtaposed star shape having a hollow core or interstitial space 470. FIG. 4B also depicts an exemplary embodiment where the portion of the outer surface of each receiver panel embracing the center core may be illuminated on a single exterior wall while the remainder portion of each of the outer surface of one side or wall of the receiver panel may be illuminated on both sides. The interstitial space 470 defined by the outer surfaces of each wall may include an aperture between two abutting walls to allow some light to illuminate the inner portion of the walls. The interstitial space 470 may also contain both structural and hydraulic elements, for example, pipes, separators, filters, and/or valves.

FIGS. 5A and 5B depict, in different views, an embodiment of a receiver 500, containing four light-absorbing receiver panels 510,520,530,540, arranged in an exemplary frusto-pyramidal configuration, where each receiver panel may be inclined on a local-level 545. FIG. 5A shows an HTF injection header or manifold 515 at the top of every receiver panel. In an exemplary embodiment a frustrum may be formed by placing the four receiver panels 510,520,530,540 about a central axis 545. In this embodiment the outer surface of one wall of each receiver panel may be illuminated so the receiver 500 may have up to 360° illumination by a surrounding heliostat field, with each receiver panel being illuminated from one side and admitting both the flooded or film flows. FIG. 5B shows another angle of the receiver 500 depicted in FIG. 5A having a header or manifold 595 with receiver panels 520, 530. To compensate for the tapering of the receiver panels and avoid uneven flow rates across the height of each receiver panel, the distance between receiver panels may be made to increase linearly with distance from the top edge, e.g., each receiver panel may have containing members of non-parallel walls.

FIG. 6A depicts an alternative embodiment of the receiver 600, comprising two or more cylindrical 600 or conical 601 light-absorbing receiver panels. The cylindrical exemplary embodiment may have four receivers 610,620,630,640 and the receiver panels may be vertically disposed so the flow may be uniform, and the walls of each receiver panels may be abutting each other in parallel. FIG. 6B shows a bottom view angle of the receiver panel 600 having a vertical axis 645 perpendicular to the local-level and the four receiver panels having a transverse curvature forming a circle. The light-absorbing surface of each of the panels may be trapezoidal in planform. FIG. 6C shows a conical depiction of the receiver 601 having four receiver panels 650,660,670,680, where the angular widths of the receiver panels grow linearly with height. In some embodiments, to equalize mass flow at every height, the front and back walls may be gapped at increasing distances from top to bottom.

In certain embodiments, structural members may be embedded within a receiver panel 700,701,702 to increase the stiffness of the receiver panel. FIG. 7A shows an I-beam shaped structural member 760 attached to both walls 730, 735, in a direction traverse to the fluid flow defined by the inlet 710 and the outlet 790. The structural members may contain apertures 737, e.g., one or more holes for passing HTF through the spine of an I-beam, thus spreading the HTF crosswise while also providing structural stiffness. Optionally, successive holes 737 of the I-beams may have staggered offsets. FIG. 7B depicts one or more structural members 770, such as I-beams, disposed in the interior and along the each individual receiver panel in the direction of the fluid flow defined by the inlet 710 and outlet 790. The structural members may optionally be fixed, e.g., welded, or may be detachably attached, to the interior of each wall. FIG. 7C depicts one or more structural members 780, where the interior baffle members may be disposed across horizontally and vertically relative to the direction of HTF flow defined by the inlet 710 and the outlet 790. In some embodiments, structural members may be directly fixed to the walls 730,735, alternatively, the structural members may be mechanically detachably attached to the walls 730,735 via spacers 785 and may allow more surface area on each wall 730,735 to admit direct fluid flow. FIG. 7D depicts a cross-section view of the exemplary embodiment of the receiver panel 702 depicting the one or more I-beam structural members 775.

In another embodiment having embedded and horizontal structural members, the gap between walls may be increased around the attachment points of the structural support so as to maintain uniform flow velocities across the entire containing member.

Figure 8A:
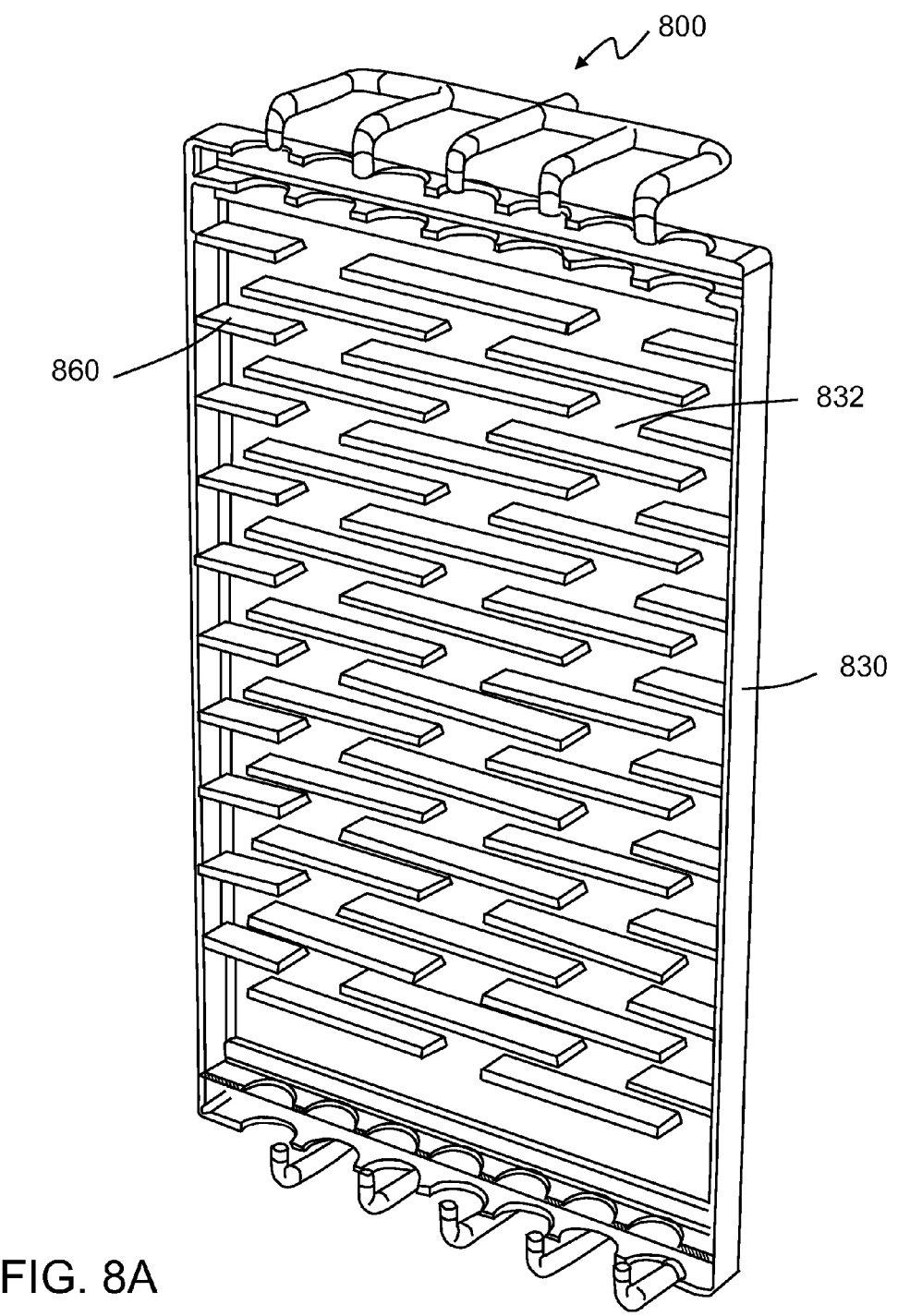
FIG. 8A depicts an embodiment of an exemplary type of a baffle geometry.
Figure 8B:
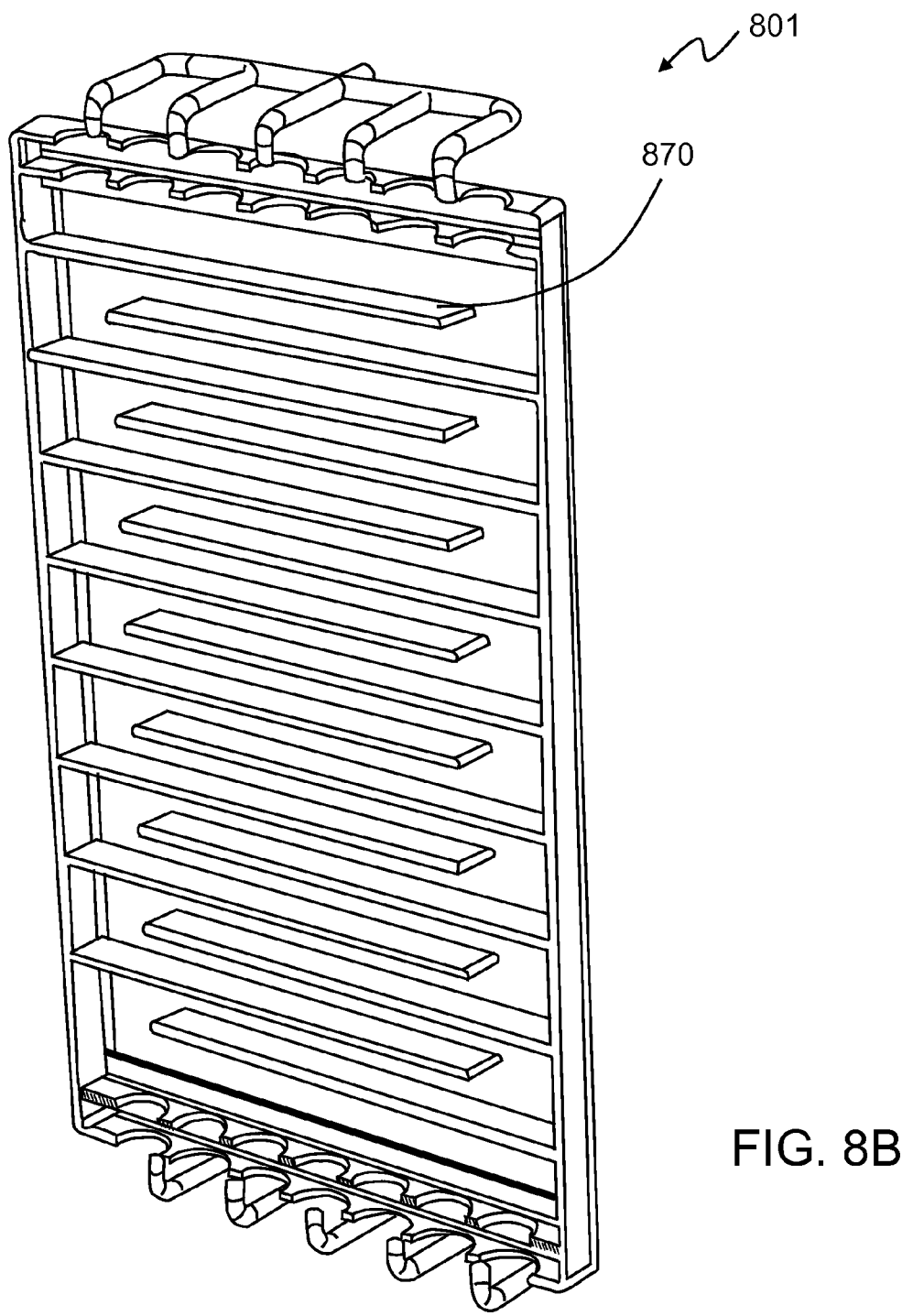
FIG. 8B depicts another embodiment of an exemplary type of a baffle geometry.
Figure 8C:
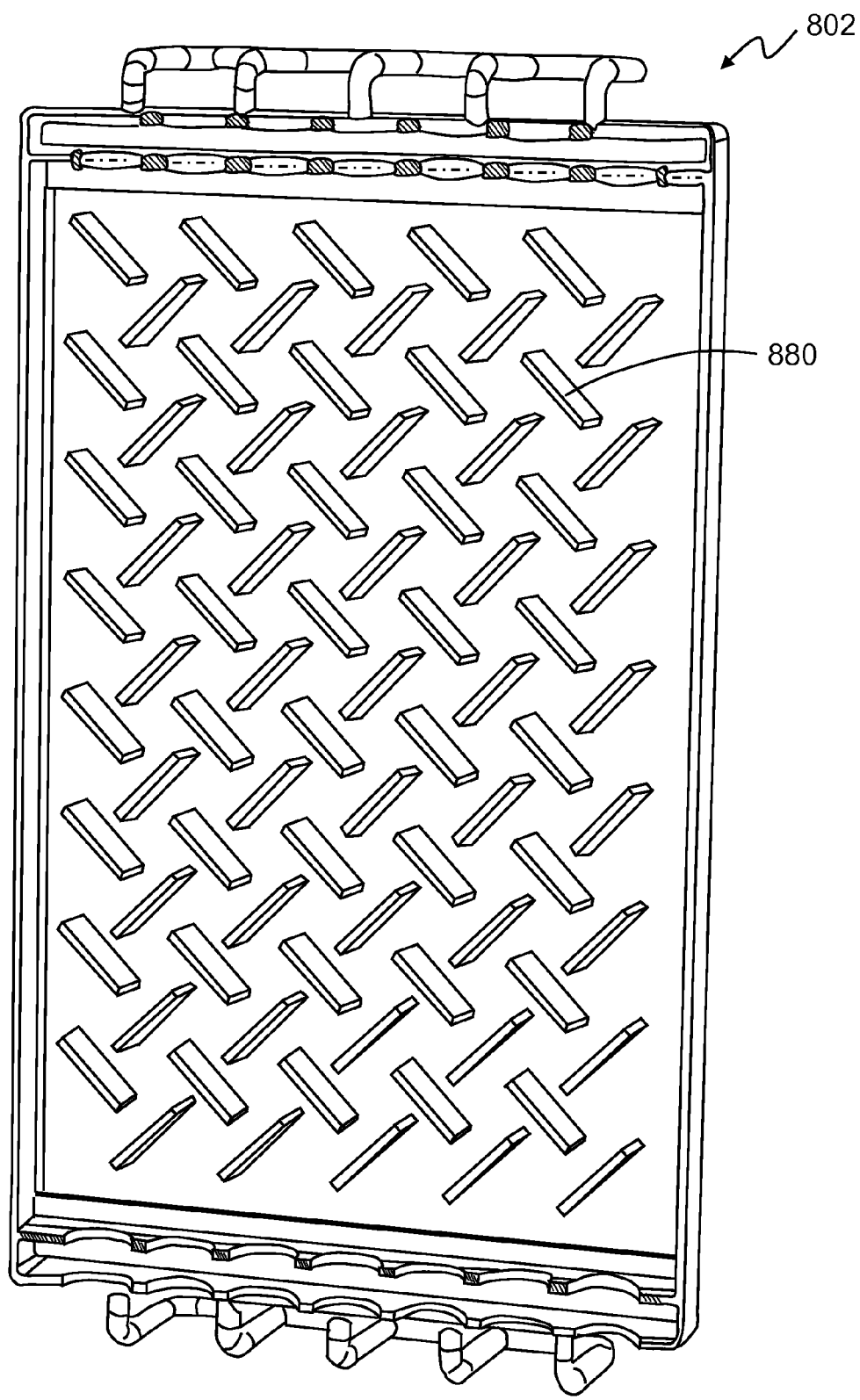
FIG. 8C depicts another embodiment of an exemplary type of a baffle geometry.

FIGS. 8A-8C show additional embodiments where the interior of a receiver panel may contain vanes 860, attached and/or protruding into the volume from one or more walls 830. Vanes 860 may act as spreaders and heat conductors, and/or diverters and may interfere with the downward flowing fluid via mixing or spreading the fluid so as to facilitate the fluid adhering to the inner surface of the walls, thereby increasing the heat transfer. FIG. 8A depicts a receiver panel 800 embodiment where the vanes 860 extend into the volume of the receiver panel 800 and are attached to the inner surface 832. The vanes are depicted as being disposed in the receiver panel relative to one another to cascade the HTF. FIG. 8B depicts the receiver panel 801 as containing vanes 870 in a long, alternating horizontal pattern. FIG. 8C depicts the receiver panel 802 as containing vanes 880 in a staggered, and inclined, pattern relative to a local-level plane.

Figure 9A:
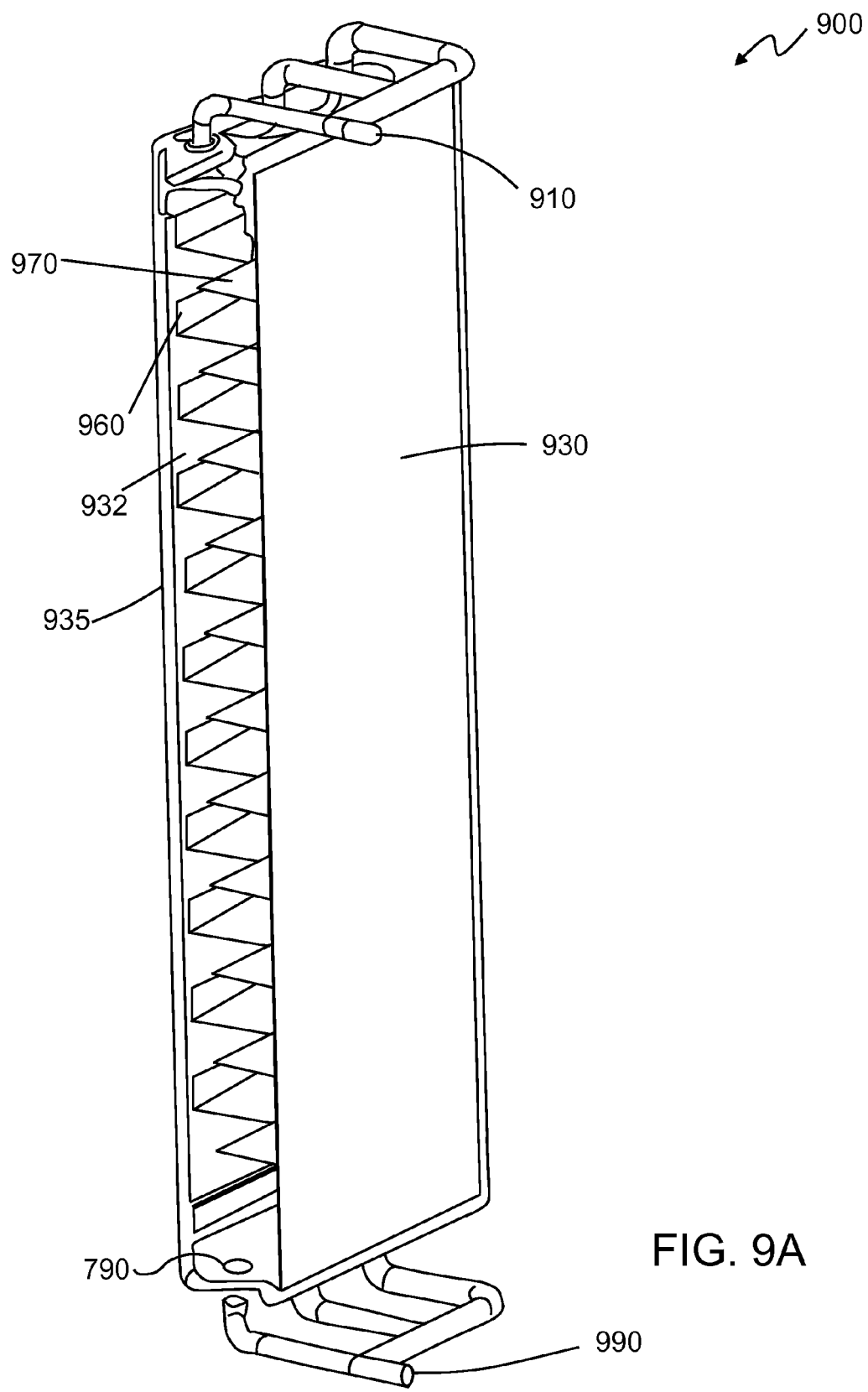
FIG. 9A depicts an exemplary embodiment of a horizontal alternating cascading baffle.
Figure 9B:
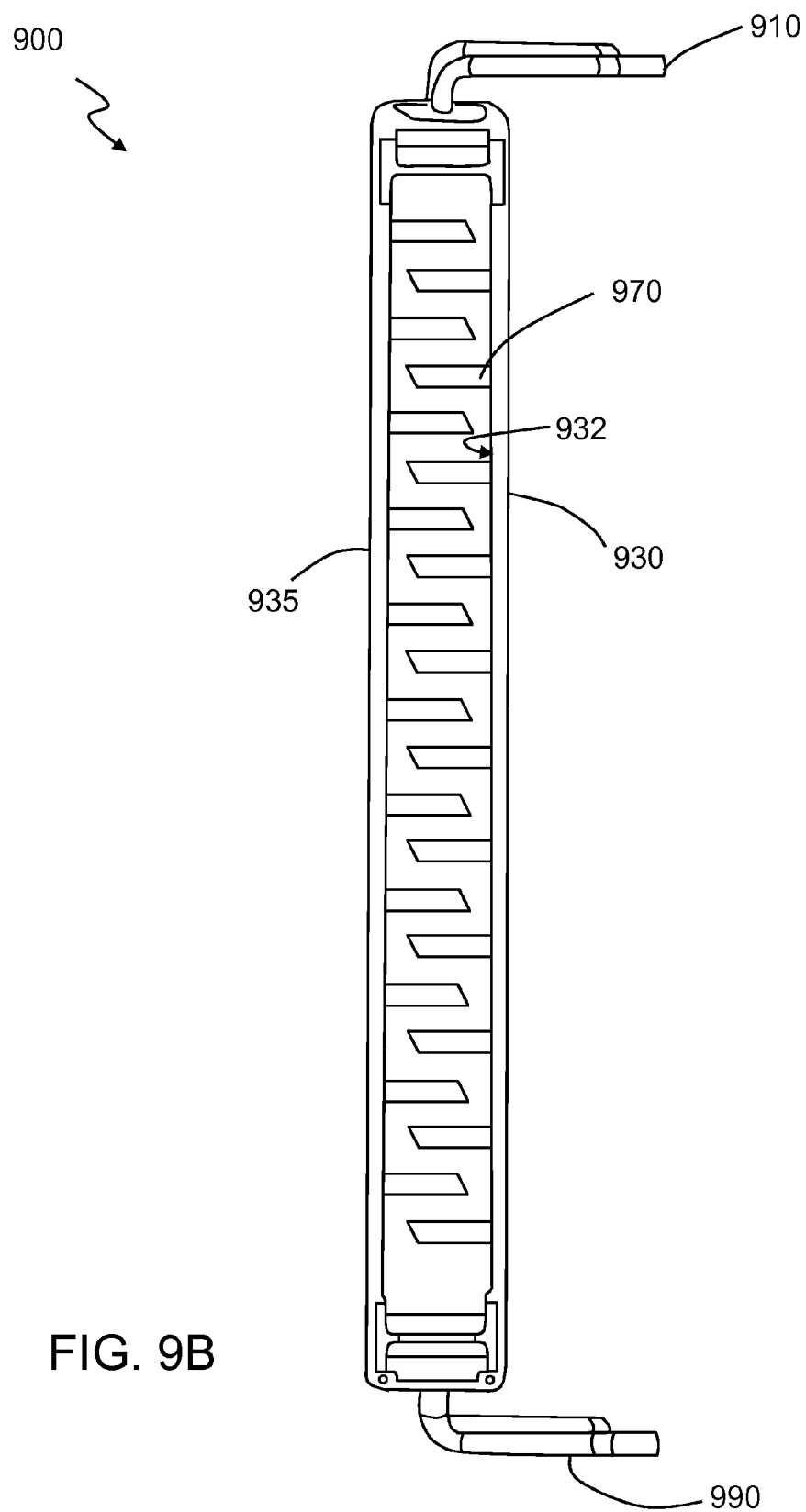
FIG. 9B depicts another view of the exemplary embodiment of a horizontal alternating cascading baffle of FIG. 9A.
Figure 9C:
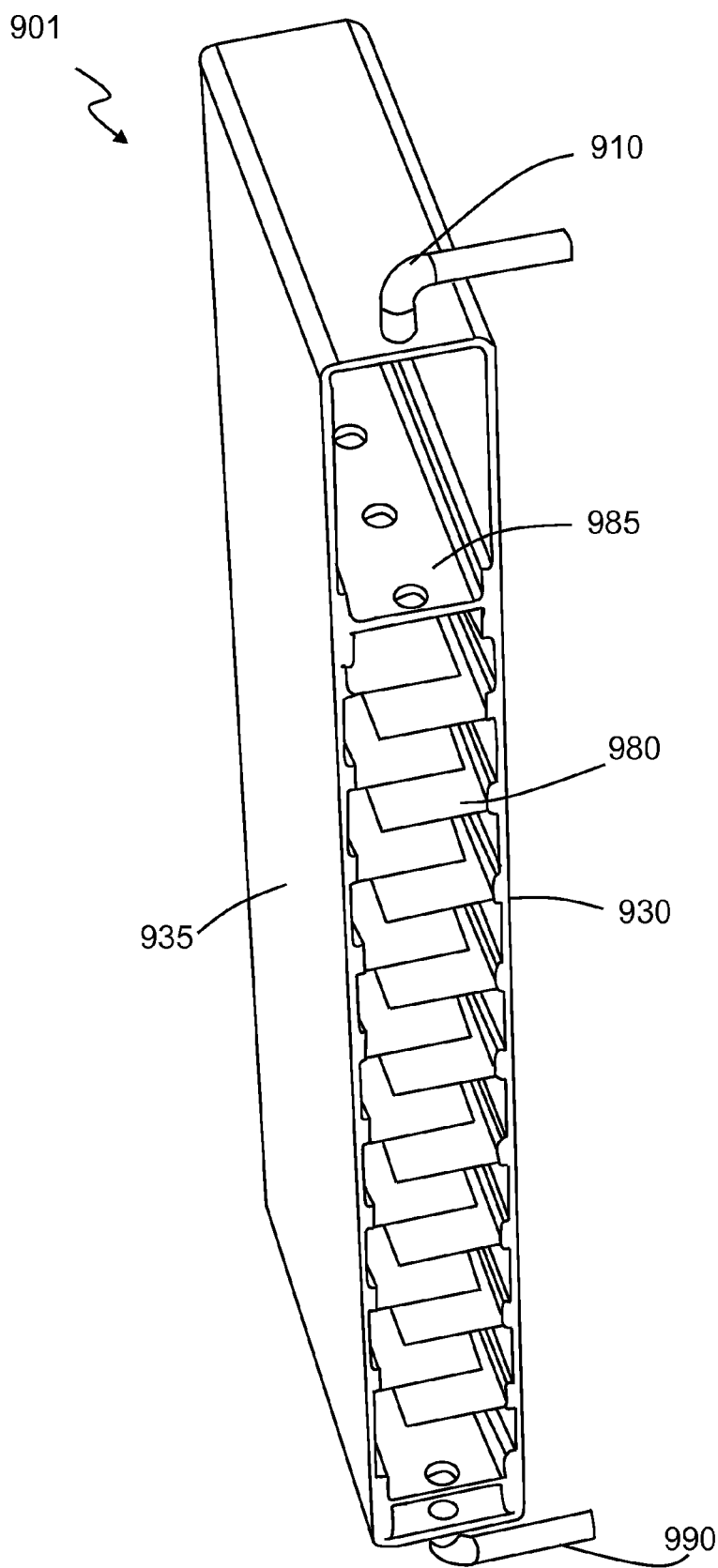
FIG. 9C depicts an another exemplary embodiment of a horizontal alternating cascading baffle.

FIGS. 9A and 9B show in different angles, the vanes 960, 970 attached or optionally welded to the inner surface 932 which protrude a distance, from one wall 930 toward the opposing wall 935 in the hollow volume. The vanes 960,970 in this exemplary embodiment protrude a distance less than the distance between the opposing walls 930,935. FIG. 9C show embodiments of the receiver panel 901 that may contain vanes 980 on one wall 930 where it may be offset a half step in height with respect to the baffles on the opposing wall 935, so that when the walls are brought together, the two vane sets interlock, producing an alternate-side and cascading effect on the downward-flowing HTF, enhancing mixing and heat transfer by slowing down the flow. FIG. 9C also depicts an embodiment of the receiver panel 901 that may contain a baffle member 985 having several apertures that may act as a flow spreader for the HTF injected via the inlet 910. FIGS. 9A-9C also depict a single inlet 910 and a single outlet 990.

Figure 10A:
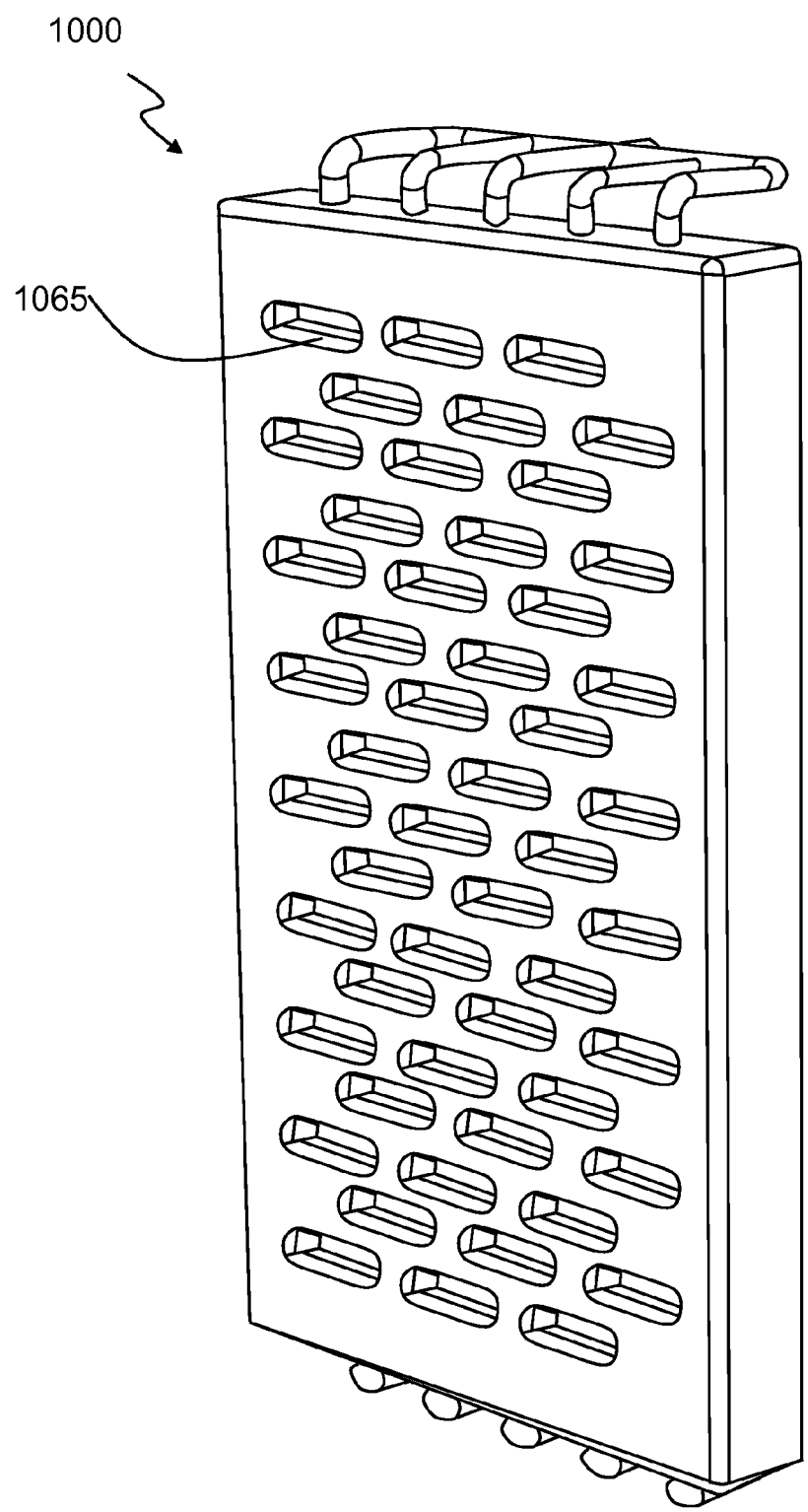
FIG. 10A depicts an exemplary baffle imprinted into both walls of a receiver panel having a staggered geometry.
Figure 10B:
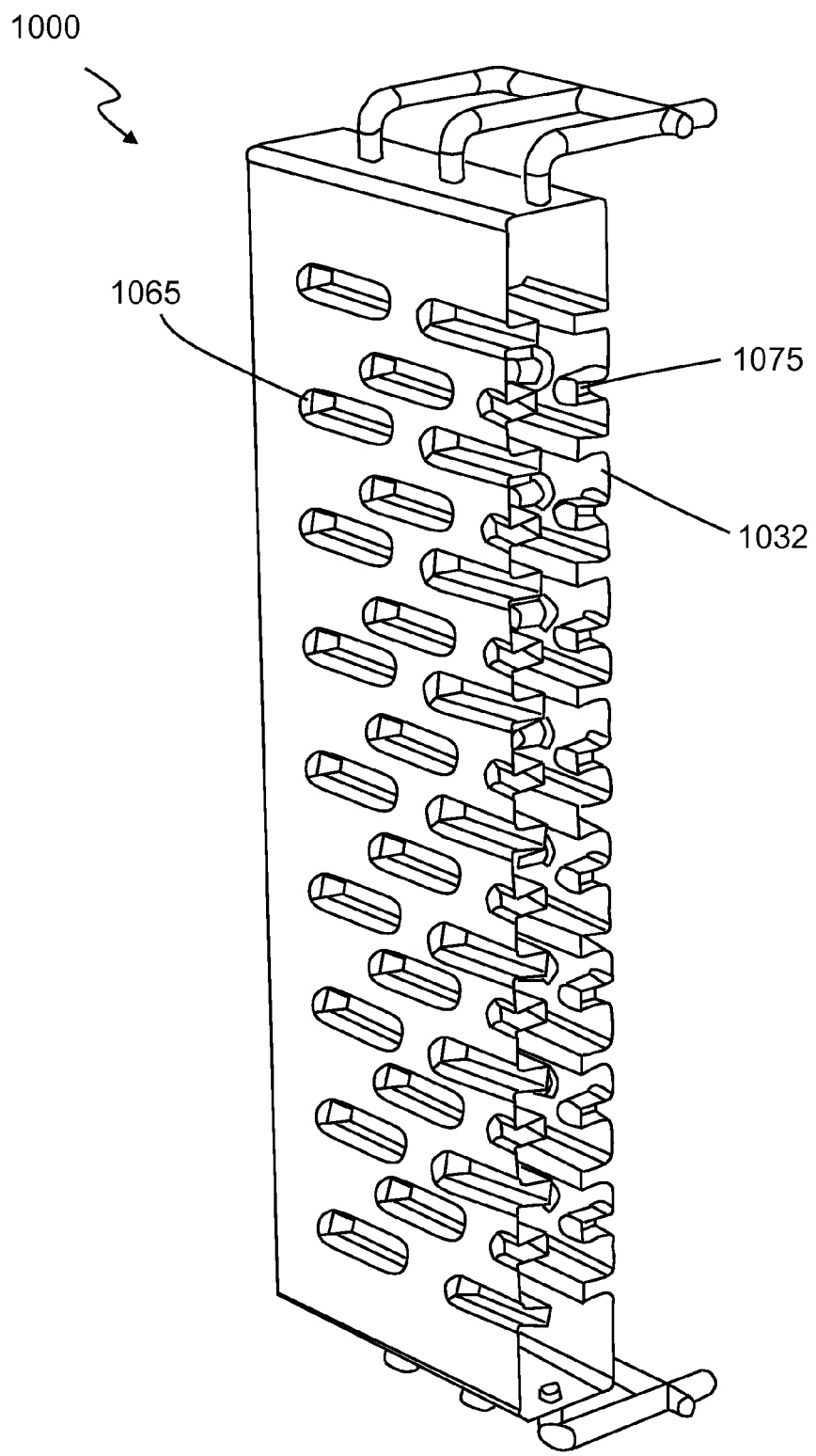
FIG. 10B depicts a cross-section view of FIG. 10A with an exemplary baffle imprinted into both walls of a receiver panel having a staggered geometry.
Figure 10C:
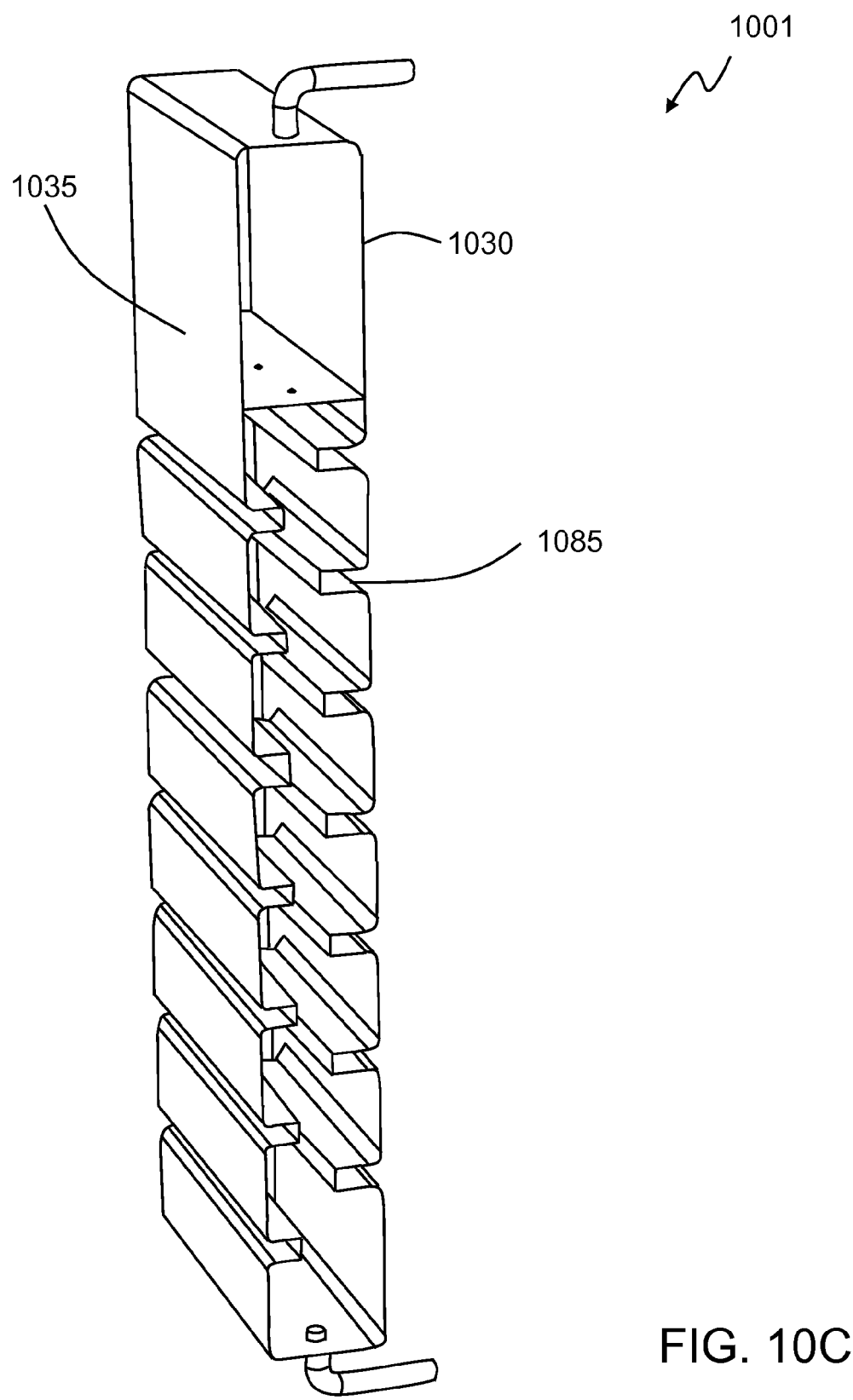
FIG. 10C depicts an exemplary baffle imprinted into both walls of a receiver panel and having a staggered geometry.

FIGS. 10A-10C depict another embodiment in which internal flow disruption and mixing may be achieved via protrusions 1065, that may be in the form of concavities, to the inner or outer surface of one or more walls. FIG. 10A depicts an embodiment of the receiver panel 1000 that contains a staggered pattern of vanes disposed along the local-level. FIG. 10B depicts a cross-section of the receiver panel 1000 of FIG. 10A having protrusions 1065 that are depicted as emerging as convexities 1075 of the inner surface 1032. Such concavities may be imprinted, stamped, rolled, or achieved via an alternate manufacturing process. FIG. 10C shows a cross-section of an embodiment of the receiver panel 1001 having a staggered set of concavities 1085, each may have a slot which may extend across the entire width and the imprints on both walls 1030,1035 and are staggered in height to achieve a cascading flow.

Other imprint patterns may be a set of at least diagonal-staggered, dimpled, hierarchical, or combinations thereof. The dimpled pattern may, for example, have each imprint be a small hemispherical cavity. Patterns may be chosen according to ease of manufacturing and the yield limits of the wall material. Additionally, imprinted baffle geometry may coexist with internal structural members described above.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A solar-thermal receiver comprising one or more panels, wherein each panel comprises:
   a hollow containing member, comprising:
      a contiguous light-absorbing outer surface having a minimal height and a minimal width;
      an outer surface opposing the light-absorbing outer surface, the light-absorbing surface and the outer surface defining a minimal depth of the containing member;
      wherein the smaller of the minimal height and the minimal width is at least four times the minimal depth; and one or more inner surfaces wherein the one or more inner surfaces define a volume of the hollow containing member;
an inlet configured to receive a fluid into the volume; and
an outlet configured to output the fluid from the volume under hydrostatic pressure;
wherein the one or more panels are inclined from a local-level, and the light-absorbing outer surface is facing a downward direction.

2. The solar-thermal receiver of claim 1 wherein the fluid is a heat transfer fluid.

3. The solar-thermal receiver of claim 1 wherein the fluid is a heat transfer fluid selected from the group consisting of oil, water, or molten salt.

4. The solar-thermal receiver of claim 1 wherein the fluid is a heat transfer fluid comprising at least one of oil, water, or molten salt.

5. The solar-thermal receiver of claim 1 wherein the hollow containing member is a prism.

6. The solar-thermal receiver of claim 1 wherein the containing member is a hexahedron, and wherein the light-absorbing outer surface has a quadrilateral planform.

7. The solar-thermal receiver of claim 1 further comprising a diverter member proximate to the inlet wherein the diverter member is configured to divert flow of the heat transfer fluid toward the inner surface.

8. The solar-thermal receiver of claim 1 further comprising at least one flow spreader disposed in the volume of the hollow containing member.

9. The solar-thermal receiver of claim 8 wherein the at least one flow spreader is fastened to at least one inner surface by one or more pins.

10. The solar-thermal receiver of claim 1 further comprising at least one vane attached to at least one inner surface wherein the at least one vane extends into the volume.

11. The solar-thermal receiver of claim 1 further comprising a plurality of vanes, each attached to at least one inner surface and disposed relative to one another to provide a cascade of the heat transfer fluid, wherein the plurality of vanes each extend into the volume.

12. The solar-thermal receiver of claim 11 wherein the at least one vane is disposed on at least one inner surface, and the at least one vane is inclined from a local-level.

13. The solar-thermal receiver of claim 1 further comprising at least one vane comprising a portion of an inner surface of the hollow containing member, and wherein the at least one vane protrudes into the volume.

14. The solar-thermal receiver of claim 1 further comprising a plurality of vanes, each vane comprising a portion of an inner surface of the hollow containing member and configured to protrude into the volume, and each vane disposed relative to one another to cascade the heat transfer fluid.

15. The solar-thermal receiver of claim 14 wherein the at least one vane is disposed inclined from a local-level.

16. The solar-thermal receiver of claim 1 further comprising at least one structural member wherein the structural member spans the volume.

17. The solar-thermal receiver of claim 16 wherein the at least one structural member is attached to at least one inner surface.

18. The solar-thermal receiver of claim 16 wherein the at least one structural member comprises one or more apertures configured to pass heat transfer fluid.

19. The solar-thermal receiver of claim 16 wherein the structural member is disposed transverse to the direction of heat transfer fluid flow defined by the inlet and the outlet.

20. A solar-thermal receiver comprising one or more panels, wherein each panel is inclined from a local-level and wherein each panel comprises:
a first panel abutting a second panel;
wherein each panel comprises:
a hollow containing member, comprising:
a contiguous light-absorbing outer surface;
wherein the light-absorbing outer surface is a quadrilateral in planform having a minimal height and a minimal width and the light-absorbing outer surface is facing in a downward direction;
an outer surface opposing the light-absorbing outer surface, the light-absorbing surface and the outer surface defining a minimal depth of the containing member;
wherein the smaller of the minimal height and the minimal width is at least four times the minimal depth; and
one or more inner surfaces wherein the one or more inner surfaces define a volume of the hollow containing member;
an inlet configured to receive heat transfer fluid into the volume; and
an outlet configured to output the heat transfer fluid from the volume under hydrostatic pressure.

21. The solar-thermal receiver of claim 20 further configured to pool the heat transfer fluid in a portion of the volume proximate to the outlet.

22. The solar-thermal receiver of claim 20 further comprising:
a third panel and a fourth panel;
wherein each panel is inclined from the local-level, wherein each panel abuts another panel at right-angles, and wherein the third panel and the fourth panel each comprises:
a hollow containing member, comprising:
a contiguous light-absorbing outer surface;
wherein the light-absorbing outer surface is a quadrilateral in planform having a minimal height and a minimal width and the light-absorbing outer surface is facing in a downward direction;
an outer surface opposing the light-absorbing outer surface, the light-absorbing surface and the outer surface defining a minimal depth of the containing member;
wherein the smaller of the minimal height and the minimal width is at least four times the minimal depth; and
one or more inner surfaces wherein the one or more inner surfaces define a volume of the hollow containing member;
an inlet configured to receive heat transfer fluid into the volume; and
an outlet configured to output the heat transfer fluid from the volume under hydrostatic pressure.

23. The solar-thermal receiver of claim 22 further comprising one or more interstitial spaces, each interstitial space defined by the outer surface of at least three of the four panels.

24. The solar-thermal receiver of claim 23, wherein at least one interstitial space further comprises one or more fluid conduits.

25. The solar-thermal receiver of claim 22 wherein the at least one light-absorbing outer surface of each of the four panels each comprise a transverse surface curvature, and wherein the four panels are disposed about a point tangent to a local level plane to form a cylindrical solar-thermal receiver.

26. A solar-thermal receiver comprising:
a first panel, a second panel, a third panel, and a fourth panel;
  wherein each of the panels is inclined from a local-level and wherein each panel comprises:
    a hollow containing member, comprising:
      a contiguous light-absorbing outer surface;
        wherein the light-absorbing outer surface is quadrilateral in planform having a minimal height and a minimal width and the light-absorbing outer surface is facing in a downward direction;
      an outer surface opposing the light-absorbing outer surface, the light-absorbing surface and the outer surface defining a minimal depth of the containing member;
      wherein the smaller of the minimal height and the minimal width is at least four times the minimal depth; and
      one or more inner surfaces wherein the one or more inner surfaces define a volume of the hollow containing member;
    an inlet configured to receive heat transfer fluid into the volume; and
    an outlet configured to output the heat transfer fluid from the volume under hydrostatic pressure.

27. The solar-thermal receiver of claim 26, wherein the four panels each abut one another to form an inverted frusto-pyramidal solar-thermal receiver.

28. The solar-thermal receiver of claim 26 wherein the at least one light-absorbing outer surface of each of the four panels each comprise a transverse surface curvature, and wherein the four panels are disposed about a point tangent to a local level plane to form a frusto-conical solar-thermal receiver.

* * * * *